United States Patent [19]

Nakajima

[11] Patent Number: 5,550,741
[45] Date of Patent: Aug. 27, 1996

[54] DOCUMENT CREATION ASSISTANCE DEVICE

[75] Inventor: Akiko Nakajima, Osaka, Japan

[73] Assignee: Matsushita Electric Industrial Co., Ltd., Osaka, Japan

[21] Appl. No.: 258,552

[22] Filed: Jun. 10, 1994

[30] Foreign Application Priority Data

Jun. 11, 1993 [JP] Japan ..................................... 5-140568

[51] Int. Cl.$^6$ ............................. G06F 3/14; G06F 17/24
[52] U.S. Cl. .................... 364/419.14; 364/419.13; 364/419.16; 364/419.17; 395/146
[58] Field of Search ......................... 364/419.02, 419.05, 364/419.07, 419.1, 419.11, 419.12, 419.13, 419.14, 419.15, 419.16, 419.17, 419.19; 395/144, 145, 146

[56] References Cited

U.S. PATENT DOCUMENTS

| 4,633,435 | 12/1986 | Morimoto et al. | 364/419.05 |
| 4,661,924 | 4/1987 | Okamoto et al. | 364/419.08 |
| 4,674,065 | 6/1987 | Lange et al. | 382/311 |
| 4,907,173 | 3/1990 | Yamada et al. | 364/419.14 |
| 4,916,656 | 4/1990 | Sasaki | 364/419.14 |
| 5,214,583 | 5/1993 | Miike et al. | 364/419.04 |

FOREIGN PATENT DOCUMENTS

| 57-75375 | 5/1982 | Japan . |
| 2-140868 | 5/1990 | Japan . |

OTHER PUBLICATIONS

Linzmayer; "Language Master", *MacUser*; v6 n1; p. 92(3); Jan. 1990; Dialog: File 275, Acc#01344016.
Perez; "Language Translation Program"; *Library Software Reviiew*; v10 n3; p. 204(6); May–Jun. 1991; Dialog: File 148, Acc#05229562.

Primary Examiner—Donald E. McElheny, Jr.
Assistant Examiner—Stephen R. Tkacs
Attorney, Agent, or Firm—Price, Gess & Ubell

[57] ABSTRACT

A document creation assistance device stores a first language document and its translation into a second language. When replacing a word (selected word) with another word (replacement word) in either of the first or second languages, all the words having the same meaning as the selected word are replaced with the replacement word in the same language, and the words corresponding to the replaced words are also automatically replaced with the translation of the replacement word in the other language.

10 Claims, 11 Drawing Sheets

Fig. 6 location information

| word | location (address) | # of characters from beginning |
|---|---|---|
| 弊社の | 1st～3rd | |
| 自家用 | 4th～6th | |
| マニュアル | 7th～11th | |
| 車 | 12th | |
| フランス語 | 14th～18th,48th～52nd,80th～84th | |
| 版 | 19th,53rd,85th | |
| マニュアル | 20th～24th,54th～58th,86th～90th | |
| . . . | . . . | |
| . . . | . . . | |

Fig. 7 dictionary (Japanese-English dictionary)

| first language (Japanese) | second language (English) |
|---|---|
| フランス語 | French |
| ドイツ語 | German |
| マニュアル | manual |
| カタログ | catalog |
| . . . | . . . |
| | |

Fig. 8 correspondence table

| first language (Japanese) | second language (English) |
|---|---|
| 1st～3rd | 43rd～45th |
| 4th～6th | 46th～56th |
| 7th～11th | 57th～62nd |
| 12th | 63rd～65th |
| . . . | . . . |
| . . . | . . . |
| 20th～24th | 34th～39th |
| . . . | . . . |
| . . . | . . . |
| 54th～58th | 133rd～138th |
| . . . | . . . |
| | |
| 86th～90th | 167th～172nd |
| . . . | . . . |
| . . . | . . . |

Your request for a French version of the manual for our domestic use manual car was received today.

We are now in the process of producing a French version of the manual for you.
The French version of the manual will be airmailed to you as soon as it is ready.

Thank you very much for your interest in our products.

Your request for a French version of the catalog for our domestic use manual car was received today.

We are now in the process of producing a French version of the catalog for you.
The French version of the catalog will be airmailed to you as soon as it is ready.

Thank you very much for your interest in our products.

Fig. 11 location information with index

| word (phrase) | location (address)    # of characters from beginning | index |
|---|---|---|
| 弊社の | 1st〜3rd | 1 |
| 自家用 | 4th〜6th | 2 |
| マニュアル | 7th〜11th | 3 |
| 車 | 12th | 4 |
| フランス語 | 14th〜18th,48th〜52rd,80th〜84th | 5 |
| 版 | 19th,53rd,85th | 6 |
| マニュアル | 20th〜24th,54th〜58th,86th〜90th | 7 |
| ... | ... | ... |
| ... | ... | ... |

Fig. 12 word candidate table

| index | # of word candidate | first language (Japanese) word candidate | second language (English) word candidate |
|---|---|---|---|
| . . . | . . . | . . . | . . . |
| 2 | 2 | 自家用 | domestic use |
| | | 商業用 | commercial use |
| 3 | 5 | マニュアル | manual |
| | | オートマチック | automatic |
| | | . . . | . . . |
| . . . | . . . | . . . | . . . |
| 5 | 8 | フランス語 | French |
| | | ドイツ語 | German |
| | | 英語 | English |
| | | . . . | . . . |
| . . . | . . . | . . . | . . . |
| 7 | 4 | マニュアル | manual |
| | | カタログ | catalog |
| | | 資料 | materials |
| | | . . . | . . . |
| . . . | . . . | . . . | . . . |
| . . . | . . . | . . . | . . . |

20,741

DOCUMENT CREATION ASSISTANCE DEVICE

BACKGROUND OF THE INVENTION (1) Field of the Invention

The present invention relates to a document creation assistance device for storing a first language document and its second language translation, for replacing a selected word at every location with a replacement word once the replacement is designated in one of these languages, and for automatically replacing the translation of the selected word with the translation of the replacement word in the other language.

(2) Description of the Related Art

A document creation assistance device stores documents in two languages, that is a document in one language and its translation in another language. Because of this construction, a document can be generated without the efforts generally taken in creating it from scratch. For this reason, the device itself has attracted much attention.

FIG. 1 shows a conventional document creation assistance device. The conventional document creation assistance device comprises a first language document storage 11, a second language document storage 12, an input unit 13, a first language replacement unit 14, a second language replacement unit 15, and an output unit 17.

The first language document storage 11 stores a first language document. The second language document storage 12 stores a second language document corresponding to the first language document (for example, the second language translation of the first language document).

The input unit 13 comprises a keyboard or the like to input a selected word, replacement word, and moves a cursor to the selected word.

The first language replacement unit 14 finds the selected word inputted by the input unit 13 in accordance with the location of the cursor, and replaces the selected word placed at the cursor with the replacement word in the document from the first language document storage 11.

The output unit 17 comprises a CRT or the like to display the documents from the first language document storage and the second language document storage 12.

The second language replacement unit 15 translates the replacement word in the second language, and replaces the word in the document from the second language document storage 12 corresponding to the selected word at the cursor with this translation.

The operation of the thus constructed document creation assistance device is described hereunder.

The cursor is moved to a word "A" in a first language document, and the word "A" is replaced with a word "B". The second language replacement unit 15 replaces a word "AA" in a second language document which corresponds to the word "A" with a word "BB" which corresponds to the word "B".

According to the conventional document creation assistance device, however, it is required to move the cursor to the selected word at each replacing. Therefore, even when the selected word is used repeatedly in a single document, the replacing must be conducted repeatedly, i.e. the number of times the selected word is used. For this reason, the replacing procedure has been very troublesome conventionally.

The batch processing which has been applied to word processors conventionally could solve the above problem. According to a batch processing function, however, words spelled in the same way as a retrieval word are searched, and every searched word is replaced with another word. Accordingly, when a first language document corresponds to a second language document and the batch processing is applied to the first language document to replace every word spelled in the same way as a retrieval word, i.e. the selected word, homographic words to the selected word are also replaced with the replacement word corresponding to the selected word in the first language document. As a result, the second language document does not coincide with the first language document in their contents.

For example, a Japanese document and an English document are stored as a first language document and a second language document respectively. When "z,1 ス" (France) is replaced with "ドイツ" (Germany) in the Japanese document, every "France" is automatically replaced with "Germany" in the English document, since "France" and "Germany" are English translations of "フランス" and "z,3" respectively.

If "フランス語" (French) is included in the Japanese document, it is also replaced with "ドイツ" (Germany), despite the fact that the word "フランス語" (French) is a language name while the word "フランス" (France) is a country name in Japanese. However, "French" which is the translation of "フランス語" is not found in the English document. Accordingly, the replacing with "German" is not carried out in the English document, while its Japanese counterpart "ドイツ語" (German) replaces "フランス語" (French) correctly. Or even if the replacement were carried out, the replaced English document would not make any sense.

As another example "高い" in the phrase "背が高い" (tall) occurs repeatedly in a Japanese document, and every "高い" (tall) is replaced with "低い" in the phrase "背が低い" (short) by batch processing.

There are homographic words to the above word "高い" (tall) in Japanese, such as that in "物価が高い" (prices of commodities are high ), "気温が高い" ( temperature is high), "学力が高い" (scholastic ability is high) When these homographic words are included in the Japanese document these "高い" s (high) are also replaced with "" (short) together with their homographic "高い" (tall).

As a further example, an English document and a Japanese document are stored as a first language document and a second language document respectively. In the English document, "set" or "bank" is inputted as the selected word. The English word "set", however, has a number of meanings. When "set" is a noun, it can mean 1. "a group of games forming a unit or part of a match in tennis", 2. "(in mathematics) a collection of things having a common property", 3. "the hardening or solidifying of a liquid substance", 4. "a number of people or things that are grouped together as similar or forming a unit", and 5. "the descent of a heavenly body below the horizon (sun)". When "set" is a transitive verb, it can mean "to put or place." Also as an intransitive verb, "set" can mean 1. "to be brought toward or below the horizon by Earth's movement", and 2. "to become more solid or hardened". The English word "bank" also has a plurality of meanings. When it is a noun, it can mean 1. "a slope, especially at the side of a river", 2. "the rising ground bordering a lake, river, or sea", 3. "the lateral inward tip of a surface (as a road or track)", and 4. "an establishment for keeping people's money". When "bank" is a verb, it can mean 1."to tilt or be tilted sideways in rounding a curve", and "to deposit money in a bank".

Thus, when the selected word has a number of meanings and is replaced with another, it is difficult to replace the second language selected word with the correct translation of the replacement word. As a result, it frequently occurs that the replaced second language document does not make sense.

SUMMARY OF THE INVENTION

Accordingly, it is an object of the present invention to provide a document creation assistance device for applying batch processing to replace a selected word at every occurrence in either a first or a second language document with a replacement word without replacing homographics to the selected word, and for automatically replacing the translation of the selected word at every occurrence with the translation of the replacement word in the other language.

The above object may be fulfilled by a document creation assistance device comprising a first language document storing unit for storing a first language document written in a first language, a second language document storing unit for storing a second language document corresponding to the first language document, an input unit for inputting a selected word and a replacement word, the selected word in the first language document to be replaced with the replacement word, a location information memory for storing a correspondence between each word in the first language document and its location, wherein the words spelled in the same way and having the same meaning are grouped into one entry to correspond to the locations of the words, a first language replacing unit for replacing a first language word at a location corresponding to the entry for the selected word in the location information memory with the replacement word, the first language word in the first language document from the first language document storing unit, and a second language replacing unit for, when the first language replacing unit operates the replacement, replacing a word in the second language document corresponding to the replaced word with a second language word corresponding to the replacement word.

The location information memory may comprise a character counting unit for counting the number of characters preceding a first character and a last character of each word from the beginning of the first language document, and writing the counting numbers into the location information memory as location information about the word.

The location information memory may comprise a first word counting unit for counting the number of words preceding each word from the beginning of the first language document, and writing the counting number into the location information memory as location information about the word.

The location information memory may comprise a second word counting unit for counting the number of words succeeding to each word until the end of the first language document, and writing the counting number into the location information memory as location information about the word.

The location information memory may comprise a correspondence table for making a correspondence between the location of each word in the first language document and the location of a word in the second language document corresponding to the first language word, and the second language replacing unit may comprise a dictionary for storing each first language word and its second language translation to translate the selected word and the replacement word from the first language into the second language.

The location information memory may comprise a character counting unit for counting the number of characters preceding a first character and a last character of each word from a beginning of the first language document, and writing the counting numbers into the location information memory as location information about the word.

The location information memory may comprise a first word counting unit for counting the number of words preceding each word from a beginning of the first language document, and writing the counting number into the location information memory as location information about the word.

The location information memory may comprise a second word counting unit for counting the number of words succeeding to each word until the end of the first language document, and writing the counting number into the location information memory as location information about the word.

The location information memory may comprise an index unit for providing an index to each correspondence between the entry including the words spelled in the same way and of the same meaning and the locations of the words, and storing the correspondence provided with the index into the location information memory, and a word candidate table for storing a word candidate which can replace the first language selected word and a second language word corresponding to each word candidate for each index.

The first language document storing unit may comprise a first storage area for storing an original document where the selected word has not been replaced with the replacement word, while the second language document storing unit may comprise a second storage area for storing a replaced document where the selected word has been replaced with the replaced word.

According to the present invention, the first language document storage stores a first language document, and the second language document storage stores a second language document which corresponds to the first language document. An input unit inputs a selected word to be replaced, and a replacement word for replacing the selected word.

The location information memory stores a selected word and locations where words of the same spelling and meaning as each selected word are placed. Accordingly, all location information about the selected word can be retrieved from the information memory. The first language replacement unit replaces the selected word with the respective replacement word according to the location information previously retrieved from the information memory; accordingly, in the replaced first language document the selected word has been replaced with the replacement word at every location. The replaced first language document is stored in the first language document storage.

The second language replacement unit replaces the second language word in the second language document corresponding to the selected word in the first language document with the second language translation of the replacement word, and stores the replaced second language document into the second language document storage. As a result, the original correspondence between the first language document and the second language document is retained between the replaced first language document and the replaced second language document.

With the document creation assistance device of the present invention, when a first language document and a second language document are stored, and the selected word is used repeatedly in the first language document, each instance can be replaced with the same replacement word at one time, also the second language translation of the selected word is automatically replaced with the translation of the replacement word at every location. Accordingly, work efficiency of the document creation assistance device is enhanced, and a desired document can be created with little effort.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 6 is a table showing exemplary location information in a location information memory 6;

FIG. 7 is an English-Japanese dictionary for translating English as a first language into Japanese as a second language as an example;

FIG. 8 is a table showing an exemplary correspondence in the location information memory 6;

FIG. 9 shows documents in Japanese as a first language and English as a second language prior to the replacement of a selected word as an example;

FIG. 10 shows documents in Japanese as a first language and English as a second language after the replacement of the selected word as an example;

FIG. 11 is a table showing an example of location information to which an index has been added; and FIG. 12 is a table which is an example of a proposed word table.

DESCRIPTION OF THE PREFERRED EMBODIMENTS

Figure 1:
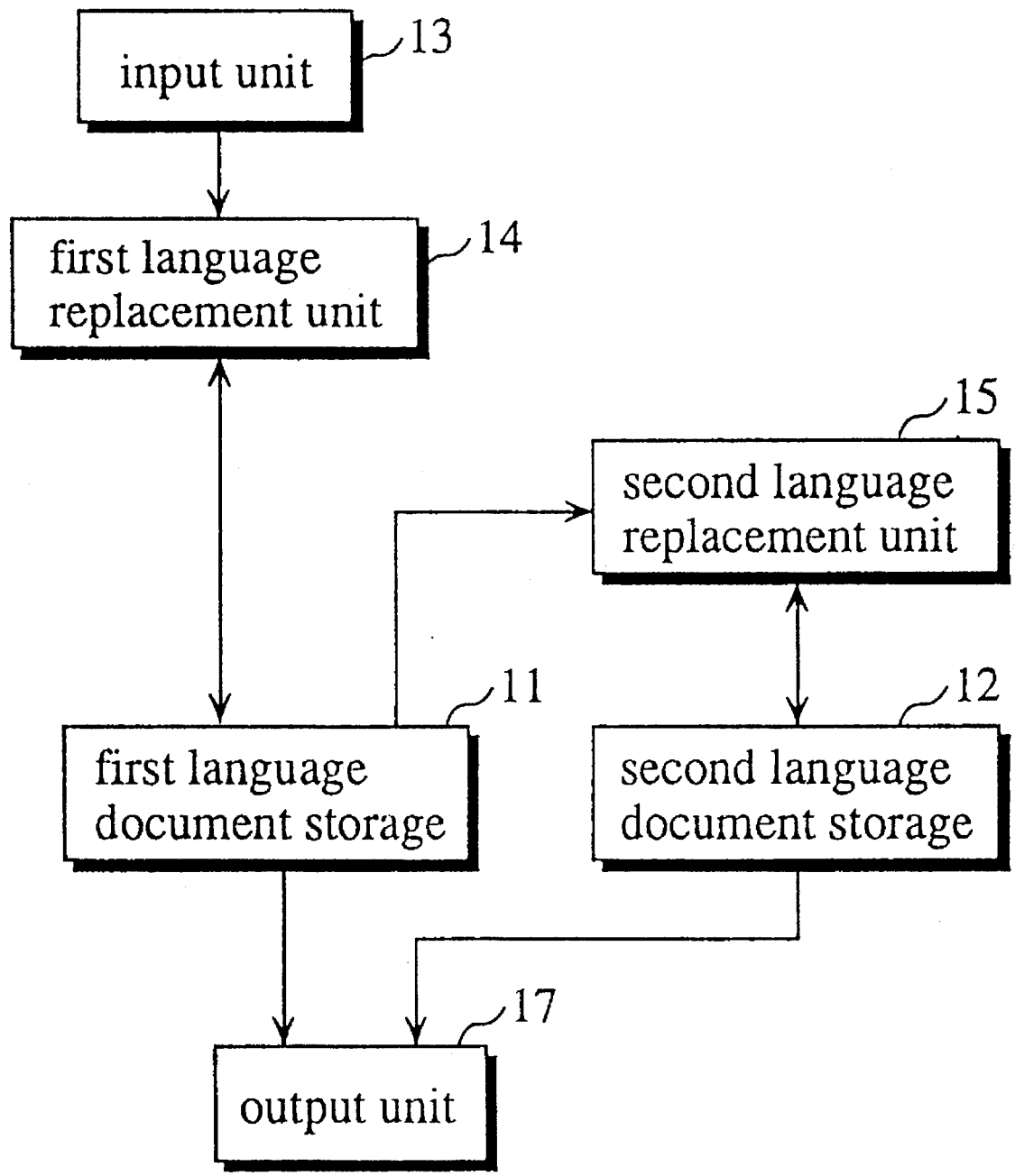
FIG. 1 is a block diagram showing the exemplary configuration of a conventional document creation assistance device.

A document creation assistance device in an embodiment of the present invention will be described hereunder as referring to the drawings.

Figure 2:
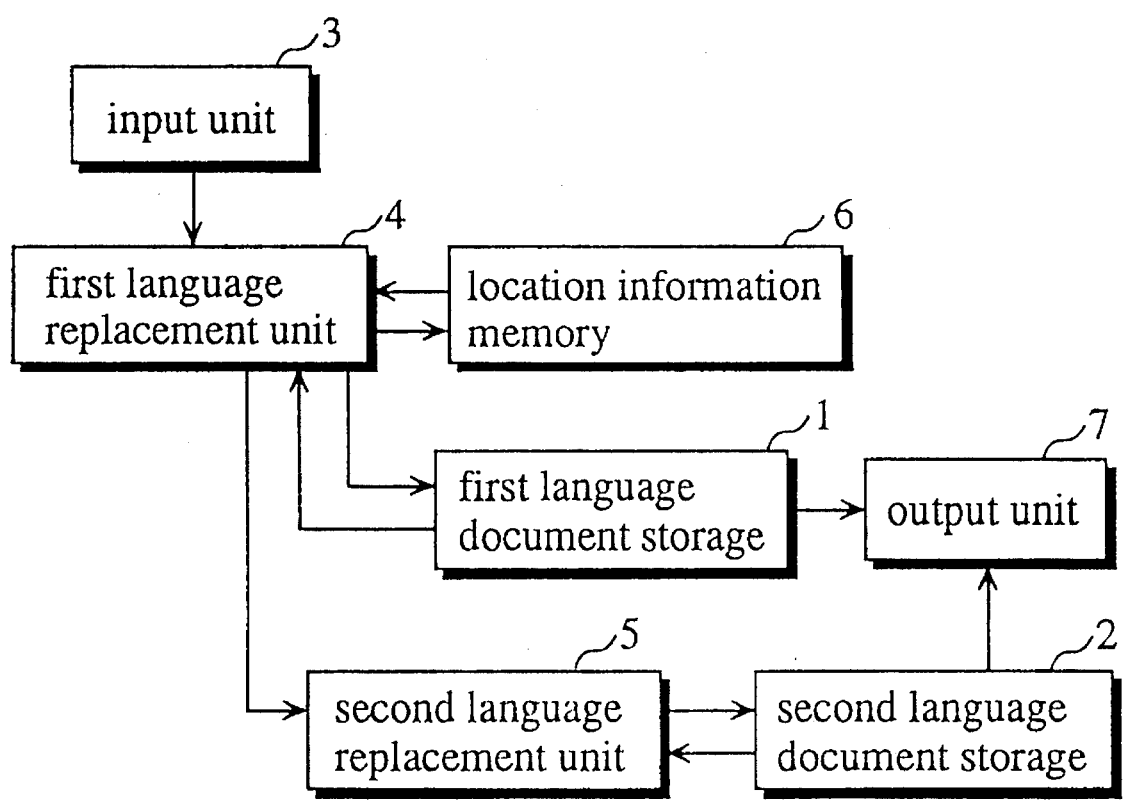
FIG. 2 is a block diagram showing the configuration of a document creation assistance device.
Figure 3:
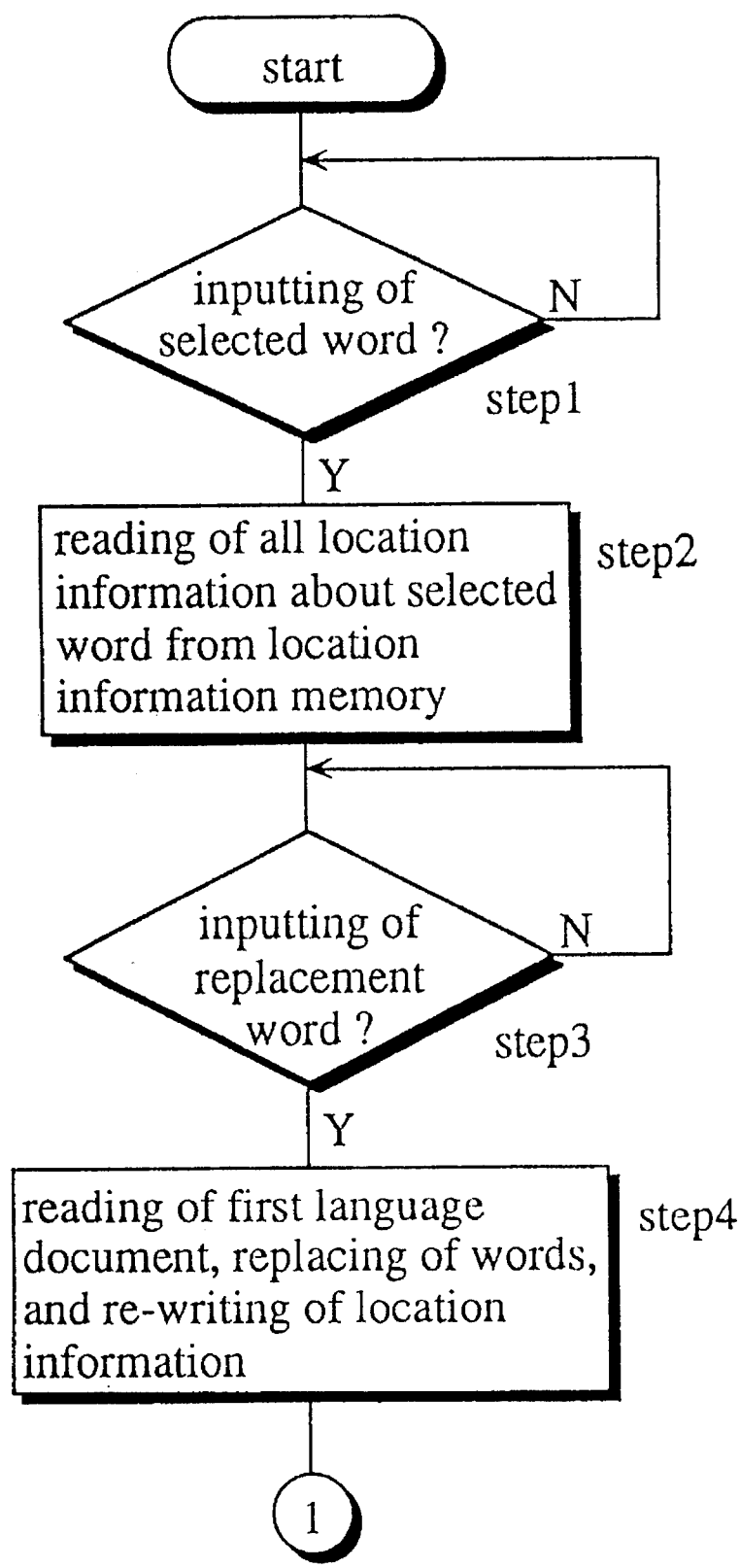
FIG. 3 is a flow chart showing the operation of a first language replacement unit 4.

More specifically, the document creation assistance device is a computer application device, and its configuration is shown in FIG. 2.

The document creation assistance device comprises a first language document storage 1, a second language document storage 2, a first language replacement unit 3, a second language replacement unit 5, and a location information memory 6, all of which are embedded in the device, as well as comprising an input unit 3 including a keyboard, and an output unit 7 including a CRT or the like.

The first language document storage 1 stores for instance a Japanese document (upper halves of FIGS. 9 and 10); and the second language document storage 2 stores the English translation (the latter halves of FIGS. 9 and 10) of the Japanese document.

The keyboard (input unit 3) inputs a selected word and a replacement word to the device.

The selected word herein represents the word to be replaced with the replacement word in the Japanese document from the first language document storage 1.

As shown in FIG. 6, the location information memory 6 relates each word in the Japanese document from the first language document storage 1 to its location(s), and stores these relations as location information. When the same word is repeatedly used in the Japanese document, a plurality of locations may be related to this word in the location information memory 6. Also, the location information memory 6 has a correspondence table storing the correspondence between the location of each Japanese word from the first language document storage 1 and the location of the English word corresponding to the Japanese word from the second language document storage 2 (FIG. 8 shows a part of this correspondence table.)

According to the location information memory 6, the first language replacement unit 4 replaces the words in the Japanese document from the first language document storage 1 corresponding to the selected word inputted by the keyboard with the replacement word, then re-writes the location information and the correspondence table in the location information memory.

The second language replacement unit 5 has a Japanese-English dictionary (FIG. 7 shows a part of its content). When the selected word is replaced with the replacement word in the Japanese document from the first language document storage 1, the second language replacement unit 5 replaces the English word corresponding to this selected word with the translation of the replacement word in the English document from the second language document storage 2 as referring to the Japanese-English dictionary and the correspondence table of the location information memory 6. At the same time, the second language replacement unit 5 re-writes the correspondence table in the location information memory 6.

The output unit 7 has a CRT for displaying the documents from the first language document storage 1 and the second language document storage 2 which are shown in FIGS. 9 and 10 respectively.

The operation of the thus constructed document creation assistance device is described as referring to the flow charts.

This operation can be roughly divided into the replacing of words in the Japanese document from the first language document storage 1 and the replacing of words in the English document from the second language document storage 2.

For example, the replacing of words in the Japanese document is conducted in an interactive mode between the user and the device. According to a guidance displayed on the CRT, the user inputs a selected word by moving the cursor to the selected word in the Japanese document with a keyboard, mouse, or the like. Accordingly, the device detects locations of the selected word internally (Step 1).

When the selected word is inputted, the first language replacement unit 4 regards this selected word as a retrieval code, then searches the location information in the location information memory 6 for this retrieval code (Step 2).

Take, for instance, FIG. 9. In the Japanese document of FIG. 9 the selected word is マニュアル (manual). Accordingly, this word, マニュアル (manual) is regarded as the retrieval code, and the location information in the location information memory 6 of FIG. 6 is searched for this retrieval code.

The phrase "弊社の" (our company) on the first row of the information memory 6 is read, then it is checked if this phrase coincides with the retrieval code, and it is found that they do not coincide with each other. Next, "自家用" (domestic use) on the second row is checked, and it is found that this phrase does not coincide with the retrieval code. As a result of the same procedure it is found that "マニュアル" (manual) on the third row coincides with the retrieval code.

Accordingly, the location information placed at the right hand of "マニュアル" (manual) on the third row is read, and it is compared with the location information inputted by the user. Since the location information from the location information memory 6 does not coincide with the inputted location information, "車" (car) on the next fourth row is retrieved and checked. Similarly, the word on the fifth row is read and checked; then the word on the sixth row is read and checked if the word on the fifth row did not coincide with the retrieval code. Thus, words or phrases are retrieved and checked one by one until the word or phrase coinciding with the retrieval code is found, and its location information coincides with the inputted location information.

The word on the seventh row coincides with the retrieval code; accordingly, the location information at the right hand of this seventh row is read. It is also found that the location information on the seventh row coincides with the location information inputted by the user.

Next, according to a guidance displayed on the CRT, the user inputs a replacement word with a keyboard or the like (Step 3). Subsequently, the first language replacement unit 4 reads the Japanese document from the first language document storage 1, and replaces the selected word placed at the first location of the above location information with the replacement word (Step 4).

Take, for instance, "マニュアル" (manual) as the selected word and "カタログ" (catalog) as the replacement word.

The selected word "マニュアル" (manual) whose location is represented by the first location information is replaced with the replacement word "カタログ" (catalog). More specifically, "マニュアル" (manual) placed between the 20the and 24the characters in the Japanese document of FIG. 9 is replaced with "カタログ" (catalog).

When written in Japanese "マニュアル" (manual) comprises five characters but "カタログ" (catalog) comprises four characters. Therefore, after replacing the selected word "マニュアル" (manual) with the replacement word "カタログ" (catalog), all location information listed after the first location information (location information in FIG. 6 and correspondence table in FIG. 8) is subtracted by one character.

According to the re-written location information, the second "マニュアル" (manual) on the seventh row is replaced with "カタログ" (catalog). Subsequently, the first language replacement unit 4 re-writes the location information, and replaces the third "マニュアル" (manual) which is found according to the re-written location information with "カタログ" (catalog).

As a result, as shown in FIG. 10, every Japanese word "マニュアル" (manual) in the Japanese document having the same meaning as the selected word is replaced with "カタログ" (catalog) but "マニュアル" (manual) in "アル車" (manual car) which is homographic to the selected word is not replaced. The replaced Japanese document is stored in the first language document storage 1.

Figure 4:
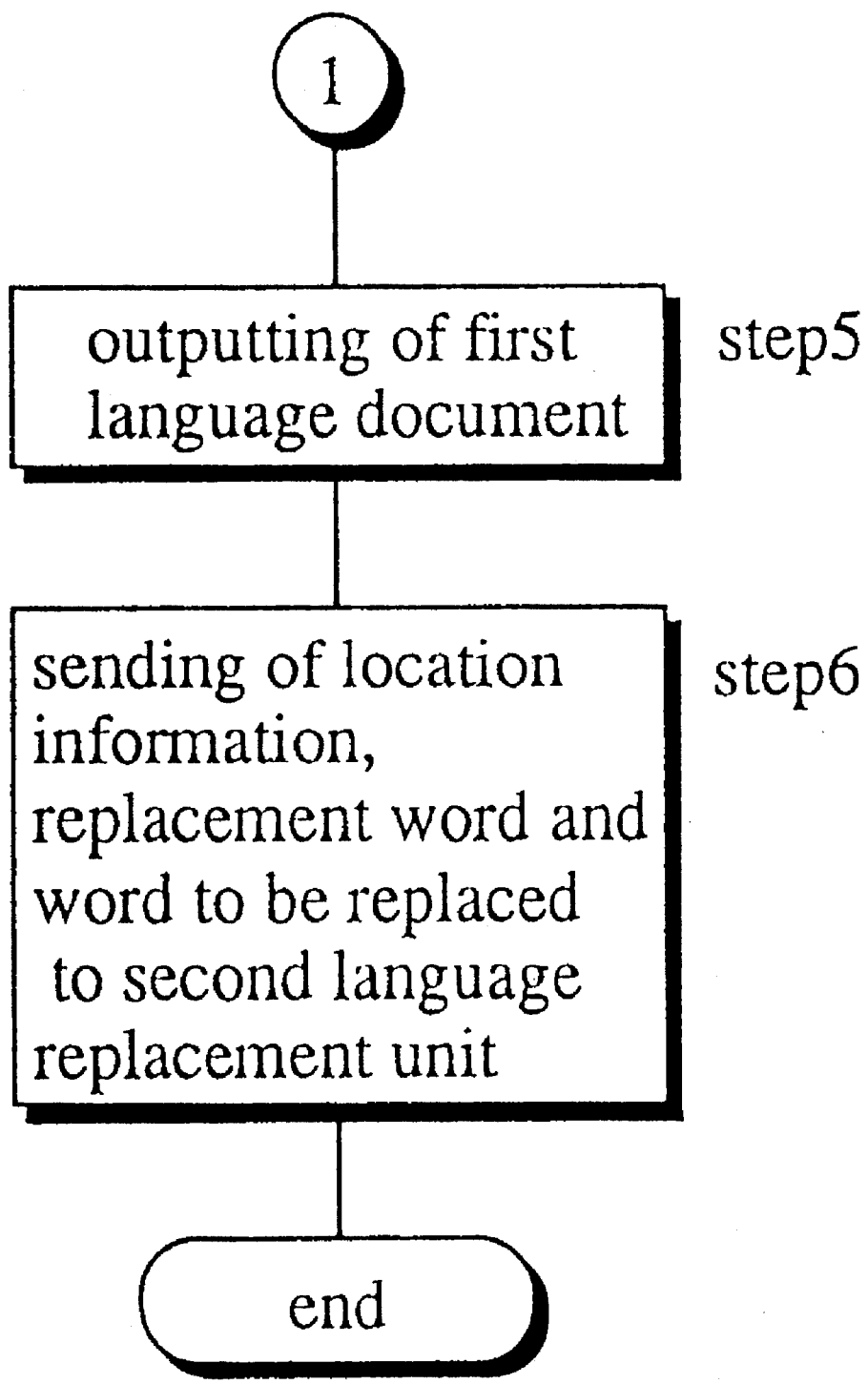
FIG. 4 is a flow chart showing the operation of the first language replacement unit 4.

As shown in FIG. 4, the replaced Japanese document is outputted to the CRT (Step 5), also the selected word which had been employed as the retrieval code, the replacement word, and the location information are sent to the second language replacement unit 5 (Step 6).

The replacing of words in the English document from the second language document storage 2 is described.

Figure 5:
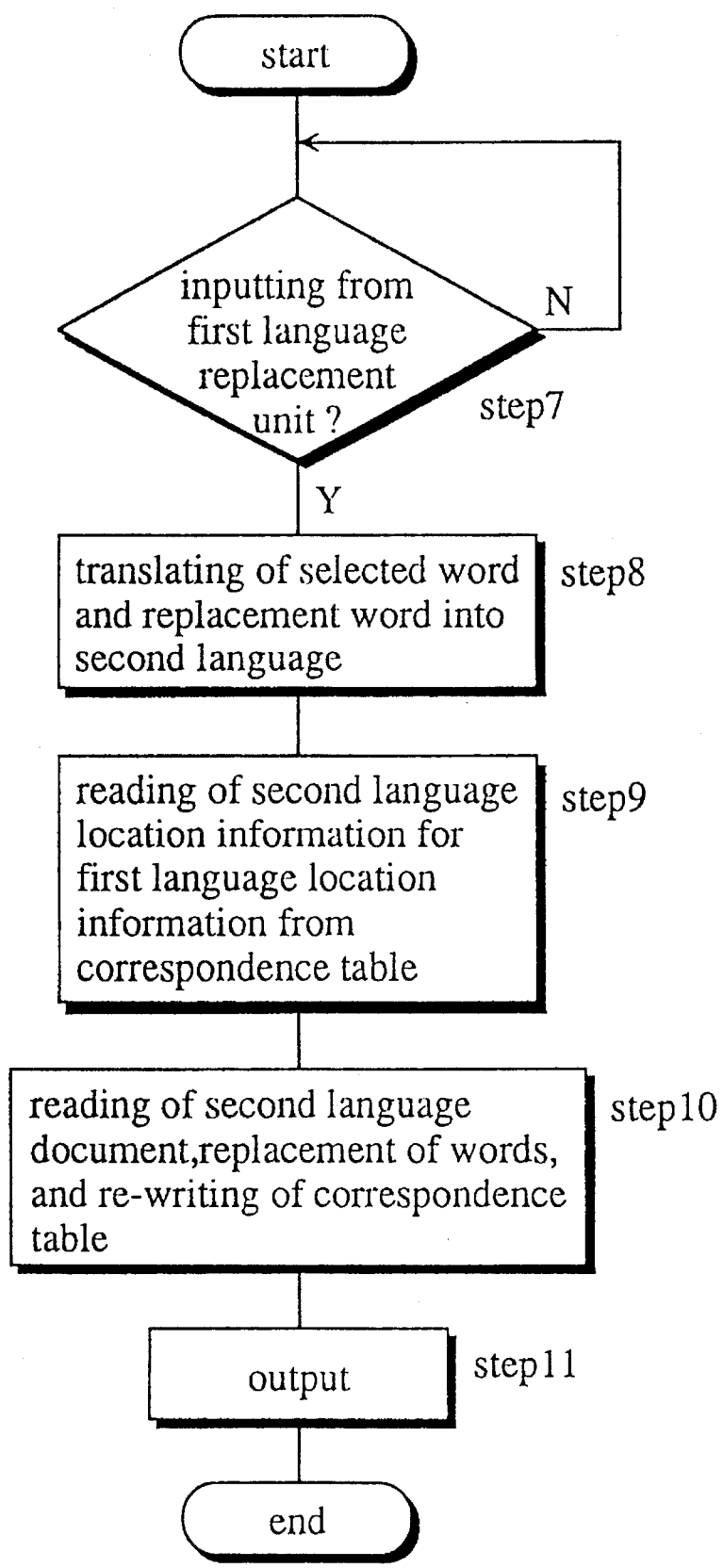
FIG. 5 is a flow chart showing the operation of a second language replacement unit 5.

As shown in FIG. 5, when the selected word, replacement word, and location information are sent from the first language replacement unit 4 to the second language replacement unit 5 (Step 7), the second language replacement unit 5 translates the selected word and the replacement word from Japanese into English as referring to the Japanese-English dictionary (Step 8). Also the English location information corresponding to the receiving Japanese location information is read from the correspondence table of the location information memory 6 (Step 9).

The English document is read from the second language document storage 2, and the English words whose locations are represented by the location information are replaced with the translation of the replacement word, and the location information in the location information memory 6 is re-written to indicate about the replaced English document (Step 10). The replaced document is stored in the second language document storage, and is outputted to the CRT (Step 11).

In the above example where the selected word is "マニュアル" and the replacement word is "カタログ", they are translated into "manual" and "catalog" respectively according to the Japanese-English dictionary. Then, the English document of FIG. 9 is read from the second language document storage 2. The English location information corresponding to the receiving Japanese location information, that is the location information about the first "マニュアル" (manual) on the seventh row, is retrieved from the correspondence table of FIG. 8

The "manual" whose location is represented by this retrieved location information (34th–39th character) is replaced with "catalog".

Since the selected word "manual" comprising six characters was replaced with the replacement word "catalog" comprising seven characters, all English location information succeeding to the above retrieved location information is increased by one in the correspondence table by the second language replacement unit 5.

Next, the English location information corresponding to the second "マニュアル" (manual) on the seventh row of the location information memory is found from the re-written correspondence table, and the English word "manual" placed at this location information is replaced with "catalog" in the second language document from the second language document storage 2. Accordingly, the correspondence table is re-written again. The English word "manual" corresponding to the third "マニュアル" (manual) is found from this re-written correspondence table, and is replaced with "catalog."

As a result of the above replacing, every "manual" having the same meaning is replaced with "catalog" in the English document from the second language document storage. FIG. 10 shows this replaced English document.

Although in the above embodiment, the location information about each word is represented by the number of characters preceding the first and last character of the word from the beginning of the document, the location of each word may be represented by the number of words preceding the word itself. If the latter location information is employed, the location information in the location information memory 6 need not be re-written after the replacing of the selected word with the replacement word even if the selected word and the replacement word comprise different number of characters from each other.

Further, the location information about each word in the location information memory 6 may be represented by the number of words succeeding to the word itself, to the end of the document. In this case, when the replacing starts from the beginning of the document, and even if the deleting or inserting of words occurs, the location information does not change. Accordingly, the re-writing of the location information in the location information memory 6 can be omitted.

Although in the above, to input the replacement word, it is typed with a keyboard, a number of word candidates which can replace the selected word may be prepared, and the replacement word may be selected from these word candidates.

The configuration and operation of this inputting of the replacement word are described hereunder. In FIG. 11, index information is provided to the location information about each selected word having the same meaning in the Japanese document. FIG. 12 is a word candidate table for storing the word candidates with which the word of each index can be replaced, and the second language translation of each word candidate.

Hereinafter, the location information including the index in FIG. 11 and the word candidate table in FIG. 12 are employed for FIG. 6. To replace the selected word in the Japanese document from the first language document storage 1, the replacement word is selected from the word candidates. Because of this inputting of the replacement word, the selected word and the replacement word corresponding to those in the first language can be obtained in the second language without looking up the Japanese-English dictionary (FIG. 7).

In the above example where マニュアル is the selected word in the Japanese document in FIG. 9, the inputting of this selected word and its locations (Step 1) and the searching and reading of the location information memory 6 (Step 2) are the same as the above.

At Step 3, the replacement word is selected from the word candidates, and it is inputted. For example, if "カタログ" (catalog), "アル車" (material), and the like are prepared for the selected word "マニュアル" (manual) these word candidates are outputted to the CRT, and "カタログ" (catalog) is selected from them. The location information about this word is sent to the first language replacement unit 4 and the second language replacement unit 5. The replacing of the selected word with the replacement word by the first language replacement unit 4 (Step 4), and Steps 5 and 6 are the same as the above.

At Steps 7 and 8, besides that the selected word "マニュアル" (manual) and replacement word "カタログ" (catalog) in the first language and their location information are sent by the first language replacement unit 1, the second language words "manual" and "catalog" corresponding to the above first language words are sent from the word candidate table of FIG. 12. The succeeding procedures (Step 9 and after) are the same as the above.

Thus, by preparing some word candidates for the replacement word, and inputting one of them, the selected word in the first language and the second language can be replaced with the inputted replacement word and the translation of the replacement word respectively.

Although in the above embodiment, the location information memory 6 and the first language replacement unit 4 are referred to or operated only in the replacing of the selected word in the Japanese document from the first language document storage 1, the location information memory 6 may also be set for the English document from the second language document storage 2. The function of the first language replacement unit 4 may also be done by the second language replacement unit 5. By doing so, when the selected word is replaced with the replacement word in the Japanese document, the second language replacement unit 5 finds the English word corresponding to this selected word, and searches the location information memory set for the second language by this English word as the retrieval code, retrieves the corresponding location information, and replaces every English word corresponding to the selected word as referring to the retrieved location information. In addition, the following can be operated.

It is possible to operate the replacement both in the English document from the second language document storage 2 and the Japanese document from the first language document storage 1 by inputting a selected word and a replacement word in English. That is, the replacement can be applied both to English and Japanese documents when the inputting is carried out in English, as well as in Japanese. In this case, by preparing the location information for the English document basically the same as that of FIG. 11, and preparing the word candidate table in English basically the same as that of FIG. 12, the English selected and replacement words may be selected from the word candidate table.

Japanese and English documents before and after the replacement may be stored in different areas of the first language document storage 1 and the second language document storage 2 respectively.

Although in the above embodiment, Japanese and English are the first language and the second language respectively, the opposite to this may be employed. Further, any two languages being foreign to Japanese can be employed as the first and second languages.

Because of the above construction, replacement of a word can be carried out in a first language and a second language automatically. For example, documents are created in a first language and a second language, and a word spelled in the same way and having the same meaning (selected word) is used repeatedly. In this case, simply by replacing the selected word at one location with another word (replacement word) in the document written in one of the languages, the selected word at every location in the document is replaced, further a word corresponding to the selected word in the other language is automatically replaced with a word corresponding to the replacement word in the other language at every location in the other document.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A document creation assistance device comprising:

a first language document storing means for storing a first language document written in a first language;

a second language document storing means for storing a second language document corresponding to the first language document;

an input means for inputting a selected word and a replacement word, the selected word in the first language document to be replaced with the replacement word;

a location information memory for storing a correspondence between each word in the first language document and its location, wherein the words spelled in the same way and having the same meaning are grouped into one entry to correspond to the locations of the words;

a first language replacing means for replacing a first language word at a location corresponding to the entry for the selected word in the location information memory with the replacement word, the first language word in the first language document from the first language document storing means; and a second language replacing means for, when the first language replacing means operates the replacement, replacing a word in the second language document corresponding to the replaced word with a second language word corresponding to the replacement word.

2. The document creation assistance device of claim 1, wherein the location information memory comprises a character counting means for counting the number of characters preceding a first character and a last character of each word from the beginning of the first language document, and writing the counting numbers into the location information memory as location information about the word.

3. The document creation assistance device of claim 1, wherein the location information memory comprises a first word counting means for counting the number of words preceding each word from the beginning of the first language document, and writing the counting number into the location information memory as location information about the word.

4. The document creation assistance device of claim 1, wherein the location information memory comprises a second word counting means for counting the number of words succeeding to each word until the end of the first language document, and writing the counting number into the location information memory as location information about the word.

5. The document creation assistance device of claim 1, wherein the location information memory comprises a correspondence table for making a correspondence between the location of each word in the first language document and the location of a word in the second language document corresponding to the first language word; and the second language replacing means comprises a dictionary for storing each first language word and its second language translation to translate the selected word and the replacement word from the first language into the second language.

6. The document creation assistance device of claim 5, wherein the location information memory comprises a character counting means for counting the number of characters preceding a first character and a last character of each word from a beginning of the first language document, and writing the counting numbers into the location information memory as location information about the word.

7. The document creation assistance device of claim 5, wherein the location information memory comprises a first word counting means for counting the number of words preceding each word from a beginning of the first language document, and writing the counting number into the location information memory as location information about the word.

8. The document creation assistance device of claim 5, wherein the location information memory comprises a second word counting means for counting the number of words succeeding to each word until the end of the first language document, and writing the counting number into the location information memory as location information about the word.

9. The document creation assistance device of claim 1, wherein the location information memory comprises an index means for providing an index to each correspondence between the entry including the words spelled in the same way and of the same meaning and the locations of the words, and storing the correspondence provided with the index into the location information memory; and a word candidate table for storing a word candidate which can replace the first language selected word and a second language word corresponding to each word candidate for each index.

10. The document creation assistance device of claim 1, wherein the first language document storing means comprises a first storage area for storing an original document where the selected word has not been replaced with the replacement word, while the second language document storing means comprises a second storage area for storing a replaced document where the selected word has been replaced with the replaced word.

* * * * *

UNITED STATES PATENT AND TRADEMARK OFFICE
CERTIFICATE OF CORRECTION

PATENT NO. : 5,550,741
DATED : August 27, 1996
INVENTOR(S) : Akiko Nakajima

It is certified that error appears in the above-indentified patent and that said Letters Patent is hereby corrected as shown below:

Col. 1, line 44, after "storage" insert --11--;

Col. 2, line 17, delete " "ﾌﾗﾝｽ" " and insert -- "フランス" --;

line 21, delete " "ﾄﾞｲﾂ" " and insert -- "ドイツ" --;

line 39, delete " "背が低い" " and insert -- "背が低い" --;

line 47, delete " "" (short) " and insert -- "低い" (short)--;

Col.. 8, line 3, delete " "ﾏﾆｭｱﾙ" " and insert -- "マニュアル" --;

Col. 9, line 50, delete " "ｼﾘｮｳ" " and insert -- "資料" --.

Signed and Sealed this

First Day of April, 1997

BRUCE LEHMAN

Attest:

Attesting Officer

Commissioner of Patents and Trademarks